United States Patent [19]

Davis et al.

[11] Patent Number: 4,626,669

[45] Date of Patent: Dec. 2, 1986

[54] INTERCEPT SYSTEM FOR INTERCEPTING STOLEN, LOST AND FRAUDULENT CARDS

[75] Inventors: William H. Davis, Fairview Park, Ohio; John J. Goba, Elizabeth, N.J.; Dean D. Riggs, Avon Lake, Ohio; Abraham Zeewy, Cleveland, Ohio; Howard M. Flint, Chagrin Falls, Ohio

[73] Assignee: Fairview Partners, Fairview Park, Ohio

[21] Appl. No.: 566,180

[22] Filed: Dec. 28, 1983

[51] Int. Cl.⁴ .............................................. G06K 9/00
[52] U.S. Cl. ................................... 235/380; 235/449
[58] Field of Search ............................... 235/449, 380

[56] References Cited

U.S. PATENT DOCUMENTS

| | | | |
|---|---|---|---|
| T921,007 | 4/1974 | Foley | 156/63 |
| 3,013,206 | 12/1961 | Youngquist et al. | 324/38 |
| 3,612,835 | 10/1971 | Andrews et al. | |
| 3,636,318 | 1/1972 | Lindstrom et al. | 235/61.12 M |
| 3,755,730 | 8/1973 | Vogelgesang | 324/34 R |
| 3,878,367 | 4/1975 | Fayling et al. | 235/61.12 M |
| 3,886,327 | 5/1975 | Dobosi . | |
| 3,890,599 | 6/1975 | Simjian . | |
| 3,911,430 | 11/1975 | Mayer . | |
| 3,914,789 | 10/1975 | Coker et al. | |
| 3,919,447 | 11/1975 | Kilmer et al. | |
| 3,919,719 | 11/1975 | Wright et al. | |
| 3,921,969 | 11/1975 | Hickey et al. | |
| 3,938,091 | 2/1976 | Atalla . | |
| 4,013,894 | 3/1977 | Foote et al. | 250/569 |
| 4,101,905 | 7/1978 | Hale et al. | |
| 4,107,653 | 8/1978 | Kruklitis | 235/449 |
| 4,138,057 | 2/1979 | Atalla . | |
| 4,138,058 | 2/1979 | Atalla . | |
| 4,140,272 | 2/1979 | Atalla . | |
| 4,171,864 | 10/1979 | Jung et al. | 235/470 X |
| 4,198,619 | 4/1980 | Atalla . | |
| 4,253,017 | 2/1981 | Whitehead | 235/449 |
| 4,268,715 | 5/1981 | Atalla . | |
| 4,281,215 | 7/1981 | Atalla . | |
| 4,283,599 | 8/1981 | Atalla . | |
| 4,288,659 | 9/1981 | Atalla . | |
| 4,298,217 | 11/1981 | Moraw et al. | 283/7 |
| 4,304,990 | 12/1981 | Atalla . | |
| 4,315,101 | 2/1982 | Atalla . | |
| 4,328,414 | 5/1982 | Atalla . | |
| 4,357,529 | 11/1982 | Atalla . | |
| 4,455,039 | 6/1984 | Weitzen et al. | 283/83 |

Primary Examiner—Harold I. Pitts
Attorney, Agent, or Firm—Fay, Sharpe, Fagan, Minnich & McKee

[57] ABSTRACT

A credit card (10) has a layer (28) of high coercivity magnetic material which is of a sufficiently high magnetic coercivity that once its dipoles are polarized, they are unable to be returned to a randomized distribution. The card is embossed with a man-readable code (30) and is electromagnetically recorded with a man-non-readable code. Particularly, the electromagnetically recorded code includes an account code (42, 44), a visual comparison algorithm code (50), a visual comparison code (52), an electronic comparison code (54), a card identification number (56), and a personal identification number (58). A reader (60) reads the account code and produces a man-readable display (102) of the electromagnetically coded account number. To verify that he has compared the display with the account number on a receipt, the merchant marks the symbols on the receipt which correspond to the highlighted symbols of the display. From the visual comparison code, the reader determines a preselected subset of the man-readable to be highlighted. Further, the reader operates on the electronic comparison code with a preselected mathematical algorithm and compares the algorithm answer with a preselected portion of the account number. As a further verification, the reader operates on the card identification number with another preselected algorithm and compares the algorithm answer with the visual comparison code. Optionally, the reader may have a keyboard (130) on which the cardholder can enter a personal identification number which the reader compares with the electronically encoded personal identification number.

20 Claims, 5 Drawing Figures

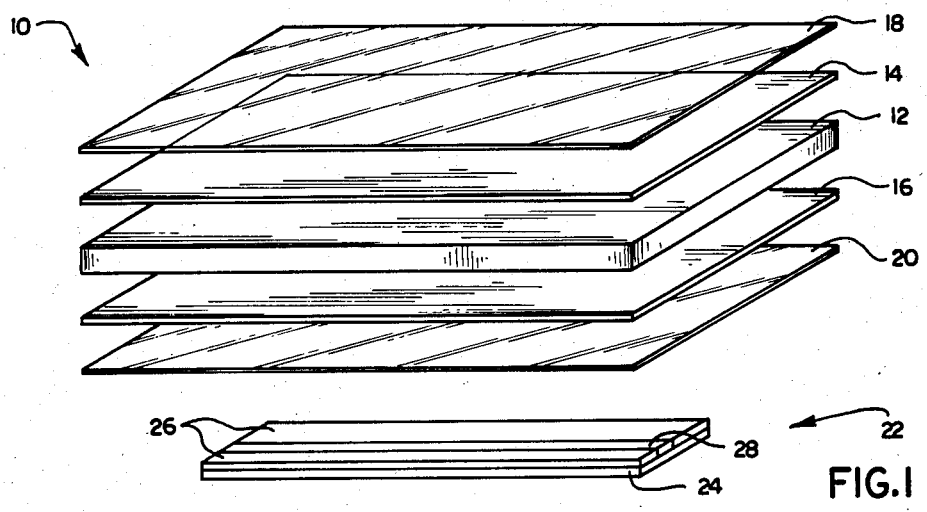
FIG.1
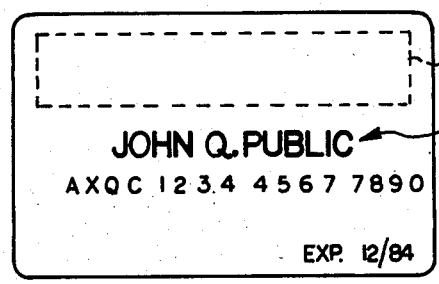
FIG.2
FIG.3
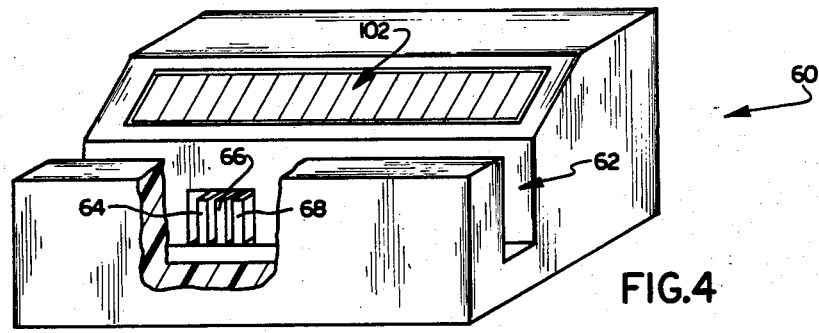
FIG.4

INTERCEPT SYSTEM FOR INTERCEPTING STOLEN, LOST AND FRAUDULENT CARDS

BACKGROUND OF THE INVENTION

The present invention relates to the art of document security. It finds particular application in conjunction with the prevention and detection of counterfeiting and alteration of charge or credit cards. However, it is to be appreciated that the present invention has broader applications including identification cards, banking and money transfer cards, passports, key cards, and other documents and structures which are to be monitored and protected against alteration and forgery.

To enable credit card handling apparatus to be used with a plurality of different credit cards, substantially all commonly used credit cards have been standardized at 33 mils thickness. Although numerous antialteration and counterfeiting systems for credit cards have been suggested in the past, most of these systems would require the credit cards to exceed the 33 mil thickness standard. Because such thicker credit cards would be incompatible with equipment already in the field, such systems have been unacceptable.

The prior art credit cards commonly include a conventional ferrous oxide recording layer along an exterior surface. The cardholders name, account number, credit limit, and other such useful information are recorded on the recording layer. However, because ferrous oxide has a low magnetic coercivity and little magnetic memory, these recordings are readily erased and rerecorded. Thus, the ferrous oxide layer is itself subject to alteration and counterfeiting.

Another system for inhibiting fraud and counterfeiting includes the incorporation of a holographic image embedded in the card. However, holographic equipment is relatively expensive. Other cards have included magnetic or magnetizable materials embedded therein in a selected magnetic pattern. Still other cards have used mechanical counterfeit and alteration inhibiting means such as detailed engraving patterns, visible threads embedded in the plastic, and other mechanical structures which are readily destroyed or rearranged during alteration.

Although these prior art credit cards inhibit alteration and counterfeiting, they are still vulnerable to the dishonest merchant. They lack a suitable method for verifying that the merchant has checked the anti-tampering and anti-counterfeiting features of the credit card. Presently, merchants are required to compare credit card numbers with a book of bad numbers and/or confirm the credit card number with a central or regional authorization center. If the merchant complies with these requirements, he is reimbursed by the credit card company, even if the merchant chooses not to notice an obvious or third rate alteration of the credit card.

The present invention provides an improved credit card structure and verification system which overcomes the above-referenced problems and others. It provides for quick, effective verification that the card is authentic and that the embossed numbers are genuine and original.

SUMMARY OF THE INVENTION

In accordance with the present invention, there is provide a method and apparatus for intercepting stolen, lost, and fraudulent documents.

In accordance with one aspect of the present invention, there is provided a method of intercepting fraudulent credit cards. A layer of relatively high coercivity magnetizable material is laminated into the credit card. The card is selectively marked with a man-readable account code, such as embossing the cardholder's name and account number thereon. The high coercivity layer is magnetically encoded with a magnetically readable account code and a magnetically readable check designation. The man-readable account code and the magnetically readable account code have a preselected correspondence. The check designation is unpredictable from the man-readable account code. The magnetically readable account code is magnetically decoded and compared with the man-readable and account code. The check designation is read and recorded to show that the magnetically readable code was decoded and compared with the man-readable code. In the preferred embodiment, a man-readable display is produced from the magnetic decoding the magnetically readable code and the check designation designates a preselected subset of alphanumeric symbols of the man-readable display.

In accordance with another aspect of the present invention, there is provided a credit card for facilitating interception of fraudulent cards. The card has a plastic body portion which is laminated with a layer of high coercivity of magnetic material. The magnetic material has magnetic dipoles which are randomly oriented during laminating and which are selectively orientable under a magnetic field with a preselected polarity. The high coercivity magnetic material has a sufficiently high magnetic coercivity that once oriented, the polarity of the dipoles is unable to be randomized under an electromagnetic field.

In accordance with yet another aspect of the present invention, there is provided a system for intercepting fraudulent credit cards. Each credit card includes a man-nonreadable and machine-readable account code and at least one man-nonreadable and machine-readable visual comparison code. A reader includes a read head for reading the machine-readable codes, a display means operatively connected with the read head for displaying a man-readable display of the machine-readable account code, and means operatively connected with the read head for deriving from the visual comparison code a man-readable designation of a subset of the man-readable display.

One advantage of the present invention is that fit intercepts lost, stolen, and fraudulent cards.

Another advantage of the present invention is that it inhibits counterfeiting and altering of the protected documents.

Another advantage of the present invention is that it inhibits merchant collusion in conjunction with the acceptance of altered or counterfeit credit cards.

Still further advantages of the present invention will become apparent upon reading and understanding the following detailed description of the preferred embodiments.

BRIEF DESCRIPTION OF THE DRAWINGS

The invention may take form in various steps and arrangements of steps or in various parts and arrangements of parts. The drawings are only for purposes of illustrating preferred embodiments of the invention and are not to be construed as limiting it.

FIG. 1 is an exploded view of a credit card in accordance with the present invention;

FIG. 2 illustrates the front face of a credit card;

FIG. 3 illustrates a coding scheme for electronically encoded account and verification codes;

FIG. 4 is a magnetically encoded credit card reading apparatus in accordance with the present invention; and, FIG. 5 is a circuit diagram of the card reader of FIG. 4.

DETAILED DESCRIPTION OF THE PREFERRED EMBODIMENT

Figure 5:
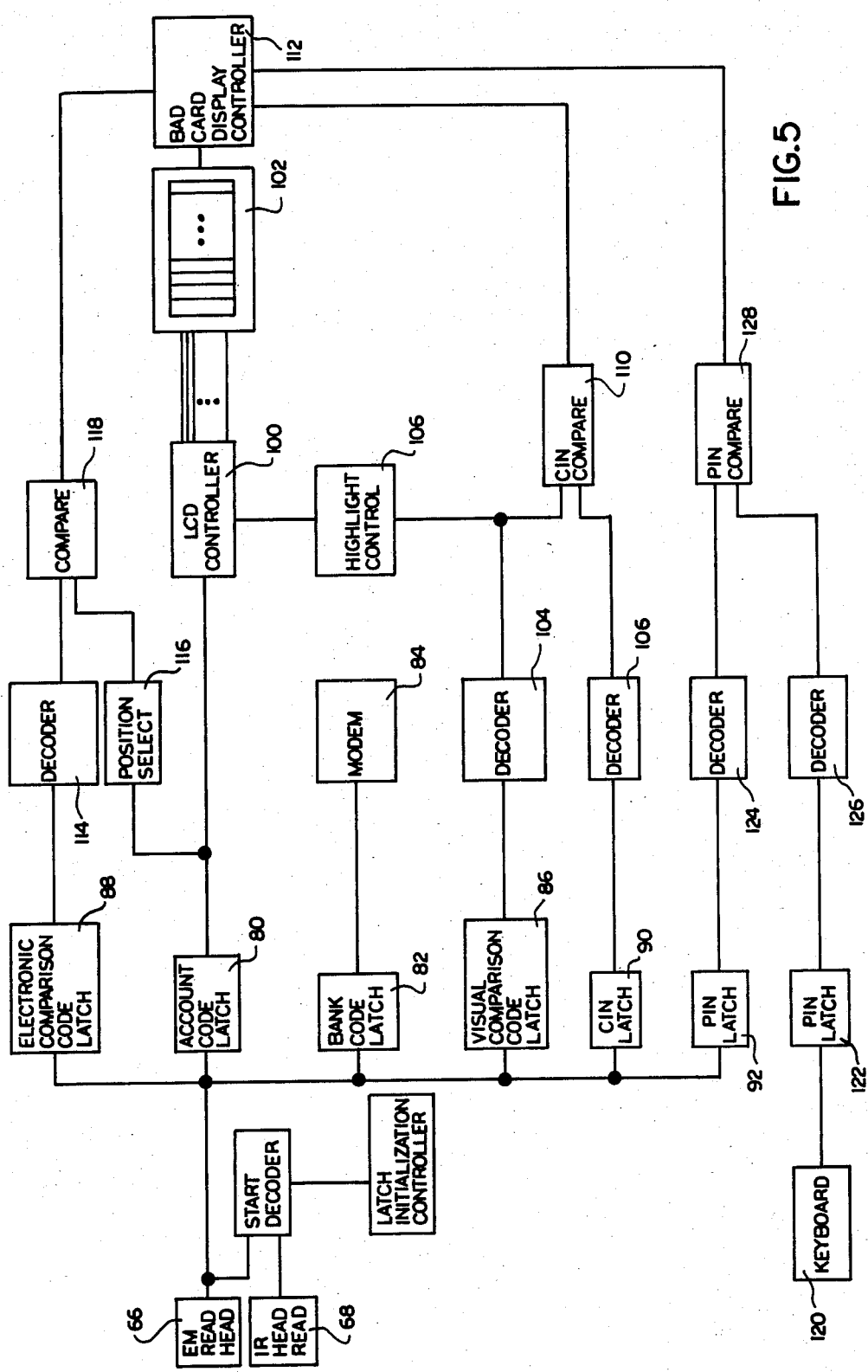

With reference to FIG. 1, a charge or credit card includes a laminated multilayered body portion 10. The body portion includes a core 12 which is several mils thick. Thin printed layers 14,16 of paper or plastic which are ½ to 5 mils thick and bear visual indicia, such as engravings, company logo, and the like are bonded to either side of the core. Clear plastic layers 18, 20, which are about 2 mils, thick are disposed over the printed layers. An electromagnetic recording strip or tape 22 is hot stamped or otherwise laminated into one surface of the card body portion 10. The recording strip includes a polymeric backing portion 24 which carries layers of low and high coercivity magnetic materials 26 and 28, respectively. The thicknesses of the core, printed layers, and clear plastic layers are selected such that when laminated under heat and pressure, the resultant credit card is substantially 33 mils thick. For simplicity of illustration, the layers of FIG. 1 have been drawn with exaggerated thickness. Any significant deviation in thickness will cause the credit card to be too thick or too thin to be utilized in conjunction with existing credit card processing equipment.

The low coercivity layer 26 includes a plurality of dipoles which can be selectively oriented with a selected polarity under the influence of an appropriate magnetic field. The low coercivity layer has a sufficiently low magnetic coercivity that the dipoles can also be electromagnetically randomized, i.e., the magnetic encoding erased. In the repreferred embodiment, the low coercivity layer includes, in primary part, particles of ferrous oxide. The high coercivity layer 28 also includes a multiplicity of magnetic dipoles. However, the high coercivity magnetic material has a sufficiently high magnetic coercivity that once the dipoles are oriented with a selected polarity, they are unable to be electromagnetically randomized. That is, once recorded, the high coercivity magnetic material is unable to be erased. More specifically, in binary encoding, once a region is oriented to designate a binary 1, the same region cannot be randomized to designate a binary 0.

The high coercivity magnetic layer 34 is manufactured in the absence of a polarizing magnetic field such that it has a multiplicity of randomly oriented dipoles which have no net magnetic moment. In the preferred embodiment, the dipoles have a magnetic coercivity of at least 1,200 to 4,500 gauss per square centimeter. Under a magnetic field in the range of 1,200 to 4,500 gauss per square centimeters, the dipoles align with the applied magnetic field. That is, the magnetic field aligns the magnetic dipoles therewith. Under a later applied magnetic field of similar strength, the alignment or polarity of the magnetic dipoles can be altered. However, once polarized, the dipoles cannot be returned to the random arrangement. In the preferred embodiment, the high coercivity magnetic material includes a mixture of colbalt ferrite and similar materials, such as rare earth metal ferro oxides.

The low and high coercivity magnetic layers 26, 28 extend in parallel stripes along the recording strip parallel to a longitudinal edge of the card such that each may carry one or more tracks or channels of data. In the preferred embodiment, the recording strip receives four tracks of data and the high coercivity magnetic layer provides the second data track. Optionally, other numbers of tracks such as three or five or more may also be utilized. Further, the high coercivity magnetic layer may carry more than one of the tracks.

In the preferred embodiment, the first track is utilized for magnetically encoding the cardholder's name. The first track may be recorded on either the high or low coercivity magnetic material. The second track records an account designation, such as an account number and an expiration date and verification codes. The second track is disposed along the high coercivity magnetic layer 28. The remaining tracks are used for carrying other information, some of which may need to be changed regularly. Such information may include credit limit, the history of recent charges, and other information which tends to change regularly. Accordingly, at least one of the remaining tracks should be recorded at least in part in the low coercivity magnetic recording material.

The card is further encoded with an infrared code. Specifically, the surface layer 20 includes infrared visible markings in an encoded pattern under the recording strip 22. The infrared encoding is achieved with alternate regions which are transparent to infrared and regions which are either reflective or absorptive. In the preferred embodiment, the infrared code includes lines of carbon black disposed at selected intervals transverse to the longitudinal axis of the recording strip. The relative positioning of the carbon black strips encodes the card with an infrared code. Further, the presence and absence of the carbon black lines functions as a binary code which may be read by an infrared read head. Alternately, the infrared encoding may be achieved with other infrared reflective or absorptive substances. Optionally, part of the high coercivity magnetic material may also carry infrared encoding. However, in the preferred embodiment, the high coercivity magnetic materials are invisible to infrared light such that the two encoding systems are separate. Read heads for infrared reflective and absorptive materials are commercially available.

In the preferred embodiment, the high and coercivity magnetic layers of the recording strip are transparent to infrared light so that they do not interfere with reading of the infrared code. Optionally, only one or a portion of the magnetic layers may be transparent to infrared to provide restricted access to the infrared coding. Ferrous oxide is a suitable low coercivity magnetic material which is transparent to infrared; cobalt and barium ferrites are suitable high coercivity materials. The high coercivity magnetic layer is preferably free of strontium ferrite, because it to is not invisible to the infrared spectrum. If carbon black should be added to either layer, it would absorb the infrared and interfere with reading of the infrared encoding therethrough. If the high and low coercivity magnetic recording materials and the polyester or other backing strip all transmit visible light, a coloring agent which blocks visible light but which is transparent to infrared light should be combined into at least one of the backing layer and the recording layers so that the infrared code cannot be decoded visually.

With reference to FIG. 2, the card is also provided with a man-readable code 30. Specifically, the cards are embossed with the cardholder's name, account number, expiration date, and other such information. To make the man-readable code more visible, the embossed letters and numbers are commonly colored in a contrasting color to the remainder of the card. Thus, the card is encoded with both a man-readable code and a radiant energy or other man-nonreadable code which in the preferred embodiment includes both an electromagnetic code and an infrared code.

With reference to FIG. 3, the man-nonreadable encoding includes an account designation or code and one or more check or verification codes. Further, various start, stop, and sentinel codes may be interposed among the various codes to insure that the various codes are read accurately and distinctly. In the preferred embodiment, a start code 40 designates the beginning of the encoding. The account code includes an account number 42 which correspond to the man-readable account number and an expiration date 44. Preferably the man-nonreadable account code is the binary equivalent of the man-readable account code. Optionally, the translation into binary may include processing the data through an algorithm for further encoding. The algorithm may interpose digits, add a constant to selected digits, or other more sophisticated manipulations.

The verification codes include a visual comparison algorithm code 50. The visual comparison algorithm code designates one of a large plurality of algorithms for generating a visual comparison code or check designation 52 from the account code. The algorithm derives from the account number a designation of a subset of the alphanumeric symbols in the man-readable code. In the preferred embodiment, three of the digits of the account number are designated. As will be explained below in conjunction with the method of use, a selected subset of the alphanumeric symbols of the account number, expiration date, customer's name, or the like are designated for verification. Upon verifying the selected subset, a merchant is required to perform an act which shows that the verification has been made.

Various algorithms may be utilized. For example, the algorithm may read one or more of the numerical digits of the account number and operate on the digits with a preselected series of mathematical or semimathematical operations to produce an answer. Preselected digits of the answer are the visual comparison code which designates the subset of the man-readable account code. The mathematical operations may include multiplying, dividing, squaring, and other such mathematical operations. The semimathematical operations may include such operations as transposing digits, using digits as addresses for a look-up table, and other such operations which manipulate and transform one or more digits predictably into other digits or groups of digits. The visual comparison algorithm should be such that one viewing the visual comparison designation and the account number cannot readily derive the algorthim therefrom.

In one embodiment of the present invention, a plurality of banks each issue credit or charge cards to their customers. Each bank has its own, unique visual comparison algorithm code which designates a unique visual comparison algorithm that is known only to the designated bank. When the cards are circulated by national companies or large banks, each visual comparison code may designate a regional processing office, each of which again has a unique corresponding algorithm. Large banks or processing offices may, of course, have a plurality of visual comparison algorithm codes and corresponding algorithms.

The verification code further include an electronic comparison code 54 for electronically verifying that the electronic code has not been altered. The electronic comparison code includes one or more numbers or letters which are related by a preselected, electronic comparison algorithm to preselected numbers or letters of the account code or other verification codes, preferably the account number. As above, numerous algorithms may be implemented. In the preferred embodiment, the numbers of the electronic comparison code are used as addresses to a ROM look-up table. The addresses retrieve the digits which are the same as digits previously encoded at preselected positions of the account code, preferably in the account number. By electronically comparing the alphanumeric values retrieved from the look-up table with the alphanumeric symbols of the corresponding positions of the account code, one can determine if the card has been altered. Optionally, the address to the ROM and the numbers retrieved from the ROM may be processed with an algorithm for additional security.

The verification codes include a card identification number 56. The card identification number is related to one of the other verification codes, preferably the visual comparison code, by a preselected algorithm. That is, operating on the card identification number with the card identification number algorithm produces the visual comparison code, or other portions of the account and verification codes. These may then be compared electronically to provide a third check on the authenticity of the card.

The verification codes further include a personal identification number 58. Each cardholder is assigned a personal identification number to be memorized. The electronically encoded personal identification number may be the same as the memorized personal identification number or may be related to it by a preselected algorithm. Electronically comparing the memorized and encoded personal identification numbers verify that the person presenting the card is its owner.

In the preferred embodiment, the account and verification codes are encoded in the second track of the recording strip on the high coercivity layer 28. Optionally, the account and verification data may be infrared encoded. Further, for some applications, these codes may be encoded in the low coercivity material.

With reference to FIG. 4, the cards are interpreted by passing them through a reader 60. In the illustrated embodiment, the card is slid manually along a slot 62 such that the recording strip 22 passes in front of an erase head 64, an electromagnetic read head 66, and an infrared read head 68. The erase head 64 is arranged to erase encoded material from the high coercivity material track. Because the track is made from material with a high coercivity, the erase head 64 is unable to erase the authentic information encoded along this track. However, the erase head will remove all of the information from a counterfeit card with a low coercivity second track and will remove any stray electromagnetic information which may have been fraudulently superimposed on the second track. In the preferred embodiment, the electromagnetic read head 66 reads the encoded information described in conjunction with FIG. 3. Optionally, the information described in conjunction with FIG. 3 may be encoded in full or in part in infrared and read by infrared read head 68. In the preferred embodiment, the infrared read head reads the relative position of the infrared encoded markings for electronic comparison to a previously selected code. The infrared markings include a start sentinel to mark the beginning of the electromagnetic encoding and an end sentinel to mark the end of the electromagnetic encoding. Optionally, additional infrared sentinels may mark the beginning of one or more of the electromagnetic codes or segments.

With reference to FIG. 5, as the recording strip moves along the electromagnetic and infrared read heads 66 and 68, the electromagnetic and infrared encoded information is read. The start code 40 and the infrared start and end sentinels are received by a decoder 70 and a latch initialization controller 72. The start code and the infrared encoded information as decoded by the decoder 70 tells the latch initialization controller 72 which is the first bit of the account and verification codes. Optionally, the infrared encoding may mark the beginning of each account and verification code segment. The latch initialization controller may alternately include a memory which stores the number of bits in each code segment.

An account code latch 80 records the account code including the account number and expiration date. A bank or visual comparison algorithm code latch 82 stores the bank or visual comparison algorithm code 50. When the reader is a part of a point of sale terminal which is connected on line with the bank's computer, the bank code latch is connected with a modem 84 to transmit the bank code as a part of the transmission to the main computer. If the reader is not connected on line to a main computer, the bank code latch may be eliminated. A visual comparison code latch 86 temporarily stores the visual comparison code 52. An electronic comparison code latch 88 stores the electronic code 54. A card identification number latch 90 stores the card identification number 56. A personal identification number latch 92 stores the electronically encoded personal identification number 58. An overflow latch 94 determines if extra characters appear beyond the end of the properly coded region. The latch initialization controller 72 controls the operation of latches 80–94 such that each records the appropriate segment of the second track.

The account code latch 80 is connected with a display controller 100 for controlling the output on a man-readable display 102. In the preferred embodiment, the display controller 100 causes the display 102 to display the account number. The display 102 is a group of seven-segment displays for displaying alphanumeric symbols. In the preferred embodiment, the display is a liquid crystal (LCD) display to facilitate battery operation. However, other displays are also contemplated by the present invention. In operation, the merchant compares the man-readable display 102 with the man-readable account code 30 embossed on the card to see if they match.

The visual comparison code latch 86 is operatively connected with a decoder 104 which implements the algorithm for converting the visual comparison code into the designation of the selected positions or digits in the display 102 to be highlighted. A highlight controller 106 is connected with the decoder 104 to cause the designated positions of the display to be highlighted. Various highlighting means are contemplated. For example, the highlighting means may include an eighth segment in the display disposed in the position of an underline such that upon actuation, selected ones of the displayed alphanumeric symbols are underlined. Other highlighting may also be used. For example, the display may include seven-segment light emitting diodes which produce a red output under one bias condition and a green output under another. The highlighter controller 106 then determines the biasing for each of the light-emitting diodes of the display to determine its color. As yet options, the highlighted symbol may be displayed with a different intensity, flashing, with a change of background color, or the like.

The card identification number latch 90 is operatively connected with a card identification number decoder 108 which implements the card identification number algorithm to convert the card identification number to the visual comparison code. A card identification number comparing means 110 compares the positions designated to be highlighted by the highlight decoder 104 with the output of the card identification number decoder 108. If the card identification number comparing means 110 determines that the designated positions do not match, it actuates a bad card display controller 112. The bad card display controller 112 causes a preselected display to appear on the display 102. For example, the bad card display controller can cause a preselected, bad card warning to appear across the display. For example, it may give the telephone number for the store owner to call to report the bad card.

The electronic comparison code latch 88 is operatively connected with an electronic comparison code decoder 114 for implementing the electronic comparison code algorithm. The decoder converts the electronic comparison code into the alphanumeric symbols which should be encoded at preselected positions of the account code. An account code position selecting means 116 reads the alphanumeric symbols at the preselected positions of the account code. A comparing means 118 compares the alphanumeric designations from the decoder 114 with the alphanumeric designations from the position selecting means 116 to see if they match. If the alphanumeric symbols read from the account code latch 80 and those derived through the electronic comparison code algorithm decoder 114 fail to correspond, the bad card display controller 112 is actuated. Optionally, the card identification number and electronic decoders 108 and 114 may implement the same algorithm. Further, both of these decoders may be ROM look-up tables which are addressed by the electronic comparison code and by the card identification number.

A date comparing means 120 compares the expiration date read from the card with a preselected date from date memory 122 to verify the date. The date verification means is particularly significant during initial installation of the system. Initially, all cards bear an expiration date which is later than a preselected first expiration date. Cards with an expiration date earlier than the first assigned expiration date cause the bad card display controller to produce the corresponding bad card display. Thereafter, the date verification means may verify that the card has not expired.

In one embodiment, the reader 60 includes a keyboard 130 or other data entry means for entering the cardholder's memorized personal identification number. A keyboard latch 132 temporarily stores the keyboard entered personal identification number. Personal identification number decoders 134 and 136 decode the personal identification numbers from the read head and keyboard for comparison by a personal identification number comparing means 138. The personal identification number from the read head is stored in latch 92 in binary form and decoder 134 converts the binary number to decimal for comparison with the keyboard entered personal identification number. Optionally, the decoder 136 may convert the decimally entered personal identification number into binary form. Further, these decoders may implement one or more algorithms to encode the stored or entered information. If the personal identification number comparing means 138 determines that the electromagnetically encoded personal identification number and the keyboard entered personal identification number fail to match, it enables the bad card display controller 112 to produce the bad card display on LCD display 102.

An overflow latch reader 140 determines whether any bits of data are stored in the overflow latch. If extra characters beyond the proper code are read from the second track and the overflow latch, the overflow reader 140 causes the bad card display means 112 to produce a corresponding bad card display on the LCD display 102.

In operation, a computer encodes each card with the appropriate man-readable code, magnetically readable codes, and infrared readable codes. Specifically, the appropriate verification codes are calculated with the appropriate preselected algorithms for recording on the card. Without these preselected algorithms for determining the various verification codes, one viewing the man-readable account information would be unable to determine the proper verification codes. Thus, a card forger would be unable to predict the corresponding verification codes for an arbitrarily selected account number or any account name and number copied from a stolen or discarded receipt.

Upon presentation of the card to a merchant to make a purchase, the merchant slides the card through the slot 62 of reader 60. The electromagnetic erase head 64 erases any low coercivity magnetic recordings on the second track. In this manner, if a counterfeiter were to replace the high coercivity second track with standard recording tape, the erase head would erase this bogus information. As the merchant moves the card through the reader, the electromagnetic and infrared read heads read the man-nonreadable encoded information producing a man-readable display 102 of the account number or other account code. The display highlights or designates a subset of the account number as commanded by the highlight control 106, e.g., three of the digits. The position of the digits to be highlighted is unpredictable from the account number alone. The merchant compares the man-readable code 30 on the card with the man-readable display 102. To be sure that the merchant makes this comparison, the merchant is required to mark the highlighted symbols on the paper receipt. For example, the merchant may be required to circle, cross through, underline, or otherwise denote the highlighted alphanumeric symbols. If the merchant fails to mark the highlighted symbols, the merchant bears the responsibility for accepting a forged card. That is, the merchant is not reimbursed by the card company for purposes made with a forged card unless the merchant has marked the proper highlighted symbols and those symbols match. If the verification codes fail to achieve the proper correspondence, the LCD display 102 produces the corresponding bad card display and the merchant calls the credit card company or authorities. Further, the merchant or the customer key in the personal identification number. Again, if the keyed personal identification number and the electromagnetically encoded personal identification number fail to correspond, the bad card display is produced and the merchant calls the authorities.

In the preferred embodiment, the bad card display controller produces eight displays: (1) an empty card display in response to both the electromagnetic data and infrared sentinels being unrecorded on any track, (2) an overflow display in response to extra characters in excess of a proper code, (3) a no characters received display in response to no electromagnetic data being read from the second track, (4) a no start sentinel display in response to an absence of the infrared start sentinel, (5) a parity error display in response to a lack of parity in one or more segments of the electronic codes, (6) a no end sentinel display in response to an absence of the infrared end sentinel, (7) an illegal first account digit display in response to the first digit of the account number being an unused digit, and (8) an improper expiration date display in response to an expiration date before the preselected first expiration date.

In an alternate embodiment, the high coercivity layer 28 is embedded within the card. The cobalt and barium ferrites and pellets of polyvinyl chloride are milled together to form a fine powdered mixture. The fine powder is utilized in a silk screen printing apparatus to print a preselected pattern of the high coercivity material onto one of the interior layers of the card. The preselected pattern may be a stripe or band, a company logo, an image, or the like. Alternately, the cobalt and barium ferrite and polyvinyl chloride mixture can be applied in a band with a knife coat application or by gravure printing. The layer with the high coercivity band is laminated with the other layers discussed conjunction with FIG. 1 under heat and pressure in a laminating press. The laminated card blank is embossed with man-readable and man-nonreadable codes. Specifically, an account code, such as a user's name, account number and expiration date are embossed in the card. Further, the card is encoded magnetically by a magnetic encoding apparatus with the account and verification codes and the like. In the preferred embodiment, the magnetic encoding is in binary with the ones and zeroes binary preselected regions of the high coercivity band which are fully saturated and which are left random, respectively. Optionally, the coding may be accomplished by fully saturating regions of the high coercivity layer with different polarities.

The highlighted alphanumeric symbols may be designated with other codes. For example, the highlighted symbols can be encoded with an opposite magnetic polarity relative to the other symbols. In the alternate polarity embodiment, the visual comparison code decoder determines the positions which have the opposite polarity. If all of the bits of one alphanumeric symbol are encoded with a first polarity, the symbol is not highlighted. If all bits are of a second polarity, the symbol is highlighted. If the bits are of mixed polarity, the bits have been altered and the bad card display controller is actuated.

The invention has been described with reference to the preferred embodiment, obviously, modifications and alterations will occur to others upon reading and understanding the preceeding description of the preferred embodiment. It is intended that the invention be construed as including all such alterations and modifications insofar as they come within the scope of the appended claims or the equivalents thereof.

Having thus described a preferred embodiment of the invention, we now claim the invention to be:

1. A method of intercepting fraudulent credit cards comprising:

laminating a layer of relatively high coercivity magnetizable material into a plastic card;

selectively marking the card with a man-readable code;

magnetically encoding at least selected portions of the high coercivity layer to encode the card with a magnetically readable code, the man-readable code and the magnetically readable code having a preselected correspondence, the magnetically readable code further including a check designation which is related to one of the man-readable and machine readable codes by a preselected relationship which is unpredictable from the man-readable code alone;

during each of a plurality of financial transactions:

magnetically decoding the magnetically readable code;

comparing the man-readable and magnetically readable code for the preselected correspondence; and, recording a representation of the check designation to show that the magnetically readable code was decoded and compared with the man-readable code.

2. The method as set forth in claim 1 wherein the relatively high coercivity layer includes a plurality of magnetic dipoles, which dipoles are randomly oriented during the laminating step and which are selectively orientable under a magnetic field of at least 1200 gauss per square centimeter and wherein the magnetic encoding step includes subjecting the selected portions of the high coercivity layer to a magnetic field of at least 1200 gauss per square centimeter to orient the magnetic dipoles, whereby the selectively oriented dipoles carry the magnetically readable code.

3. The method as set forth in claim 2 wherein during the magnetic encoding step, the randomly oriented magnetic dipoles are selective oriented with first and second polarities and retained randomly oriented, whereby the first polarity, second polarity, and randomly oriented portions form a trinary magnetically readable code.

4. The method as set forth in claim 2 wherein the marking step includes embossing the card with the man-readable code, the man-readable code including alphanumeric symbols.

5. The method as set forth in claim 1 wherein the decoding step includes electrically converting a portion of the magnetically readable code into a man-readable display.

6. The method as set forth in claim 5 further including the step of printing at least one of the man-readable code, the magnetically readable code, and the man-readable display on a receipt.

7. The method as set forth in claim 6 wherein the magnetically readable code check designation designates a preselected subset of the man-readable code and wherein the recording step includes marking a corresponding subset of the receipt printing, whereby marking the receipt subset provides a check to indicate that the man-readable display and man-readable code were compared.

8. The method as set forth in claim 5 wherein decoding the check designation includes highlighting a preselected subset of alphanumeric symbols of the man-readable display.

9. The method as set forth in claim 5 wherein the check designation includes at least one verification code which is derived by applying a preselected one of a plurality of algorthims to at least a portion of one of the man-readable and magnetically readable codes.

10. The method as set forth in claim 9 wherein the verification code is a visual comparison code which designates a preselected subset of the man-readable display to be highlighted.

11. The method as set forth in claim 9 wherein the verification code includes an electronic verification code which is related to the magnetically readable code by a preselected algorithm and further including the steps of applying the preselected algorithm to the one of the electronic verification code and magnetically readable code to produce an answer and comparing the answer with the other of the electronic verification code and the magnetically readable code.

12. The method as set forth in claim 10 wherein the verification code further includes a card identification number which is related to the visual comparison code by a preselected algorithm and further including the steps of applying the preselected algorithm to one of the visual comparison code and the card identification number to derive an answer and comparing the answer with the other of the card identification number and the visual comparison code.

13. A system for intercepting fraudulent credit cards comprising:

(a) at least one credit card including an account code which includes a man-nonreadable, machine-readable account designation and a man-readable, machine-readable visual comparison code; and, (b) a reader including:

a read head for reading the machine-readable codes, a display means operatively connected with the read head for displaying a man-readable display of the machine-readable account designation, and, a means operatively connected with the read head for deriving from the visual comparison code a man-readable designation of a subset of the man-readable display, the deriving means being operatively connected with the display means for displaying the subset designation thereon.

14. The system as set forth in claim 13 wherein the card further includes an electronic comparison code and wherein the reader further includes decoder means for decoding the electronic comparison code and comparing means for comparing the decoded electronic comparison code with a preselected portion of the account code, the comparing means being operatively connected with the display means for selectively producing a man-readable bad card display.

15. The system as set forth in claim 13 wherein the card further includes a card identification number; and wherein the reader further includes decoder means for operating on one of the visual comparison code and the card identification number and comparing means for comparing the decoder output with the other of the visual comparison code and the card identification number, the comparing means being operatively connected with the display means for selectively producing a man-readable bad card display.

16. A method of intercepting fraudulent credit cards comprising:

selectively marking each card with a man-readable account code;

encoding each card with a machine-readable, man-nonreadable account code and with a machine-readable, man-nonreadable visual comparison code.

decoding at least a portion of the machine-readable account code and producing a man-readable account code display therefrom;

decoding the visual comparison code and deriving a designation of a corresponding subset of the man-readable display therefrom;

comparing the man-readable code and the man-readable display; and, recording the designated subset of the man-readable display.

17. A method of intercepting fraudulent credit cards comprising:

on issuance, marking each card with an account code and with a verification code that have a preselected relationship therebetween;

during a financial transaction, electronically deriving an answer code by operating on one of the account code and the verification code with at least one preselected algorithm; and, comparing the derived answer code with the other of verification code and the account code from the card for a preselected correspondence.

18. A method of electronically verifying the authenticity of credit cards comprising:

on issuance, marking each card with an account code, with an expiration date, and with a verification code which is related to the account code and expiration date by a first algorithm;

during a financial transaction, electronically operating on the verification code and at least one of the account code and the expiration date with a second algorithm to determine whether the verification code is not related to the account code and expiration date by the first algorithm.

19. The method as set forth in claim 18 wherein the step of electronically operating with the second algorithm includes:

electronically deriving an answer code by operating on at least one of the account code, expiration date, and the verification code with at least a third algorithm;

comparing the derived answer code with at least a portion of the account code, expiration date, and verification code to ascertain whether there is a preselected correspondence.

20. The method as set forth in claim 19 further including the step of entering at least one of the account and verification codes with a keyboard.

* * * * *